United States Patent [19]

Hallenstvedt et al.

[11] Patent Number: 5,715,728
[45] Date of Patent: *Feb. 10, 1998

[54] TRANSMISSION DEVICE, ESPECIALLY A REVERSING GEAR FOR BOATS

[75] Inventors: Oddjörn Hallenstvedt, Köping; Bo Kristiansson, Kungsör, both of Sweden

[73] Assignee: AB Volvo Penta, Gothenburg, Sweden

[*] Notice: The term of this patent shall not extend beyond the expiration date of Pat. No. 5,509,323.

[21] Appl. No.: 670,617

[22] Filed: Jun. 26, 1996

[30] Foreign Application Priority Data

Jun. 26, 1995 [SE] Sweden ................................ 9502301

[51] Int. Cl.⁶ .......................... F16H 3/14; B63H 23/08
[52] U.S. Cl. ........................ 74/417; 192/51; 192/107 M
[58] Field of Search ........................... 192/51, 107 M; 74/417

[56] References Cited

U.S. PATENT DOCUMENTS

| | | | |
|---|---|---|---|
| 2,917,019 | 12/1959 | Krueger | 192/51 |
| 3,216,392 | 11/1965 | Shimanckas | 192/51 |
| 3,269,497 | 8/1966 | Bergstedt | 192/51 |
| 3,323,622 | 6/1967 | Troka | 192/51 |
| 4,257,506 | 3/1981 | Bankstahl | 192/51 |
| 4,679,682 | 7/1987 | Gray | 192/51 |
| 4,944,378 | 7/1990 | Christian. | |
| 5,325,732 | 7/1994 | Vogel | 74/424.8 R |
| 5,509,323 | 4/1996 | Hallenstvedt | 192/51 |

FOREIGN PATENT DOCUMENTS

| | | |
|---|---|---|
| 2 314 348 | 9/1974 | Germany. |
| 417075 | 2/1981 | Sweden. |
| 501 269 | 12/1994 | Sweden. |
| 2 133 094 | 7/1984 | United Kingdom. |

Primary Examiner—Charles A. Marmor
Assistant Examiner—David M. Fenstermacher
Attorney, Agent, or Firm—Young & Thompson

[57] ABSTRACT

Reversing gears for boats, comprising an angle gear with two gears (4,5) which are rotatably mounted on a secondary shaft (8) and are alternately lockable to the shaft by means of a clutch sleeve (11). The clutch sleeve has exterior clutch cones (12,13), which are coated with a surface coating of chemical nickel which has been impregnated and coated with a fluoroplastic layer and then been heat-treated. The rotatably mounted gears (4,5) have interior clutch cones (14, 15) of tempered steel.

3 Claims, 1 Drawing Sheet

5,715,728

TRANSMISSION DEVICE, ESPECIALLY A REVERSING GEAR FOR BOATS

BACKGROUND OF THE INVENTION

1. Field of the Invention

The present invention relates to a transmission device, especially a reversing gear for a marine engine, comprising a first shaft with a first gear non-rotatably fixed to said shaft, a second shaft mounted perpendicular to the first shaft with two second gears freely rotatably mounted on said second shaft, said second gears engaging the first gear and each having an individual interior conical frictional surface, and, between said second gears, a clutch sleeve axially displaceably mounted on the second shaft and having two exterior conical frictional surfaces which face away from each other and which each cooperate with an individual one of said interior frictional surfaces to alternately lock the second gears to the second shaft.

2. Description of the Prior Art

Transmission devices of this type are available in a number of different variants of reversing gear mechanisms for boats, both in traditional inboard installations and in outboard drive units, e.g. of the AQUAMATIC®-type. SE-A-417075 shows and describes, for example, a reversing gear mechanism of the type described by way of introduction and which is included in a basic transmission which, together with a number of different attachments, forms a modular system.

These transmissions are used today together with engines rated at above 400 HP and must be able to transmit torque exceeding 600 Nm. They must be able to withstand repeated shifting without slippage or binding. This places great demands on the selection of materials and on maintaining small tolerances.

One design which has been used during recent years and which has proved to fulfill the requirements concerning transmission of high torque, operational reliability and long life, has a clutch sleeve and clutch rings of tempered steel which are joined to the rotating gears. The interior frictional surfaces of the clutch rings have been coated with a wear layer of molybdenum. All of the frictional surfaces have been ground with great precision to achieve high surface smoothness, which is necessary to achieve the desired function. This has, among other things, meant that one was first forced to apply a relatively thick layer of molybdenum, of which approximately two thirds was ground off in the grinding operation. Molybdenum is an expensive material and the grinding process used is relatively complicated and this made the reversing mechanism, which is in principle rather simple, relatively expensive to manufacture.

SUMMARY OF THE INVENTION

The purpose of the present invention is to achieve a transmission device of the type described by way of introduction, which can be manufactured at lower cost than the known transmission device described, but which nevertheless has at least as high torque transmitting capacity, reliability and length of life as the known transmission device.

This is achieved according to the invention by virtue of the fact that at least one of said interior and exterior conical frictional surfaces is coated with a layer of heat-treated chemical nickel with an integrated fluoroplastic.

By providing the frictional surfaces of the clutch sleeve, for example with a wear layer consisting of a conically precipitated nickel layer, which has been impregnated and surface-coated with a fluoroplastic layer and then been heat-treated, a number of important characteristics are obtained in a transmission device described by way of introduction. Thus, high hardness and good wear resistance is obtained, and this results in low wear and thus minimal soiling of the transmission oil, and this increases the total life of the transmission. The low tendency to clash prevents clashing during emergency and hard shifting. The low coefficient of friction and the good release properties provide easy engagement and disengagement of gears. An even layering is obtained which makes possible free tolerances without after-treatment.

BRIEF DESCRIPTION OF THE DRAWINGS

The invention will be described in more detail below with reference to examples shown in the accompanying drawing, which shows a longitudinal section through a transmission device according to the invention.

DESCRIPTION OF THE PREFERRED EMBODIMENTS

Figure 1:
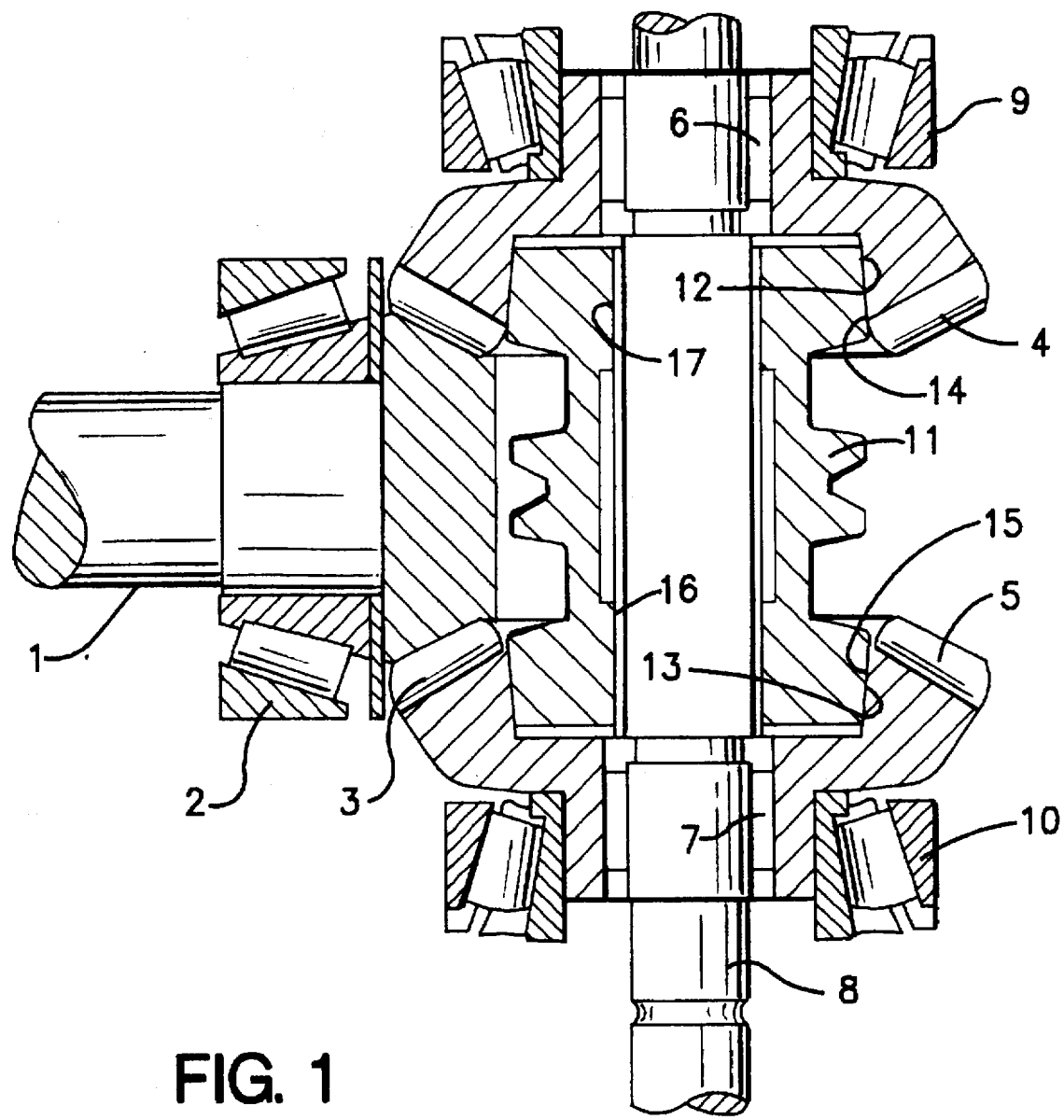

The transmission shown in the figure shows an input shaft 1 which is mounted in a roller bearing 2 in a housing (not shown in more detail here). The bevel gear 3 is rigidly attached to the shaft 1 and engages two bevel gears 4,5, which are rotatably mounted through needle bearings 6,7 to a secondary shaft 8. The gears 4,5 are also mounted in roller bearings 9,10 in the housing (not shown), which can be the housing to a reversing gear for a purely inboard engine installation or a portion of an outboard drive unit. In both cases, the secondary shaft drives one or two (concentric) propeller shafts via angle gearing.

On a secondary shaft 8, a clutch sleeve 11 is displaceably mounted, and has exterior conical frictional surfaces 12,13, which upon axial displacement of the sleeve 11 by means of shifting means (not shown in more detail here) can be brought into engagement with interior conical frictional surfaces 14, 15 on the gears 4,5 for non-rotatable coupling of the gears 4 or 5 to the secondary shaft 8. The clutch sleeve 11 is provided in a known manner with an internal screw thread 16, which engages a corresponding external screw thread 17 on the secondary shaft 8, so that turning the sleeve on the shaft results in axial displacement of the sleeve 11. The screw thread is directed so as to reinforce the engaging force between the cooperating frictional surfaces 12,14 and 13,15.

The clutch sleeve 11 preferably consists of steel or bronze. Its conical frictional surfaces 12, 13 are coated with a layer consisting of chemically precipitated nickel, which has been impregnated and coated with a fluoroplastic and then heat-treated. Coatings of this type are commercially available under the trademark NEDOX® and have been previously used as a surface coating on gears and on casting dies for plastic products with small draft angles.

The frictional surfaces 14,15 of the gears 4,5 are, in the example shown, ground directly in the gears 4,5 themselves, which are manufactured in case-hardened steel, but the frictional surfaces 14,15 can also be worked in separate rings joined to the gears.

Alternatively, the frictional surfaces 14, 15 can be surface-treated with chemical nickel which has been impregnated with fluoroplastic and heat-treated. The clutch sleeve can have coated or uncoated metal surfaces.

We claim:

1. A marine transmission device, comprising a first shaft with a first gear non-rotatably fixed to said first shaft, a second shaft mounted perpendicular to the first shaft with two second gears freely rotatably attached to said second shaft, said second gears engaging the first gear, each of said second gears having an individual interior conical frictional surface, and, between said second gears, a clutch sleeve axially displaceably mounted on the second shaft and having two exterior conical frictional surfaces which face away from each other and which each cooperate with an individual one of said interior frictional surfaces to alternately lock one of the second gears to the second shaft, wherein said interior and exterior conical frictional surfaces are surfaces on metal members, and at least one of said interior and exterior conical frictional surfaces (12, 13) is coated with a layer of heat-treated chemical nickel with an integrated fluoroplastic.

2. A marine transmission device according to claim 1, wherein the exterior conical frictional surfaces (12, 13) of the clutch sleeve (11) have said surface coating of a layer of heat-treated chemical nickel with an integrated fluoroplastic, while the interior conical frictional surfaces (14, 15) are uncoated metal surfaces.

3. A marine transmission device according to claim 1, wherein the interior conical frictional surfaces (14, 15) have said surface coating of a layer of heat-treated chemical nickel with an integrated fluoroplastic, while the exterior conical frictional surfaces (12, 13) are uncoated metal surfaces.

* * * * *